(12) United States Patent
Huang

(10) Patent No.: US 8,777,403 B2
(45) Date of Patent: Jul. 15, 2014

(54) ASSEMBLY OF OPTICAL LENS AND EYEGLASS FRAME

(76) Inventor: Chih-Chang Huang, Tainan (TW)

(*) Notice: Subject to any disclaimer, the term of this patent is extended or adjusted under 35 U.S.C. 154(b) by 104 days.

(21) Appl. No.: 13/524,476

(22) Filed: Jun. 15, 2012

(65) Prior Publication Data

US 2013/0335696 A1 Dec. 19, 2013

(51) Int. Cl.
*G02C 1/04* (2006.01)
*G02C 1/02* (2006.01)
*G02C 1/00* (2006.01)

(52) U.S. Cl.
CPC .. *G02C 1/04* (2013.01); *G02C 1/02* (2013.01); *G02C 1/00* (2013.01)
USPC .............................. 351/106; 351/86; 351/103

(58) Field of Classification Search
CPC ............... G02C 1/00; G02C 1/02; G02C 1/04
USPC ............. 351/103–109, 154, 41, 86, 135, 140; 24/3.12, 485, 573.09–573.11, 580.11, 24/DIG. 31, DIG. 32, DIG. 35; 292/340–341; 411/104
See application file for complete search history.

(56) References Cited

U.S. PATENT DOCUMENTS

| | | | | |
|---|---|---|---|---|
| 6,742,891 B2 * | 6/2004 | Chen | ........................... | 351/140 |
| 7,077,372 B2 * | 7/2006 | Moran | ..................... | 248/222.11 |
| 7,118,209 B1 * | 10/2006 | Wang Lee | ....................... | 351/86 |
| 7,216,404 B1 * | 5/2007 | Doyle | ........................ | 24/573.11 |
| 7,360,889 B2 * | 4/2008 | Yong | ................................ | 351/47 |
| 7,887,182 B2 * | 2/2011 | Van Atta et al. | .............. | 351/105 |
| 8,201,939 B2 * | 6/2012 | Schepke | ........................ | 351/86 |

FOREIGN PATENT DOCUMENTS

TW 287946 M 2/2006
TW 371893 M 1/2010

* cited by examiner

*Primary Examiner* — Thomas K Pham
*Assistant Examiner* — Nicholas Pasko
(74) *Attorney, Agent, or Firm* — Rosenberg, Klein & Lee

(57) ABSTRACT

An assembly of an optical lens and an eyeglass frame is revealed. The assembly mainly includes a fastener mounting into and locked between a middle part of the eyeglass frame and a middle part of the optical lens, where the eyeglass frame and the optical lens mounted with each other. Moreover, a stopping plate is mounted into the eyeglass frame at the position corresponding to the fastener. By the stopping plate locked with the fastener, the fastener will not separate from the eyeglass frame. Therefore the connection between the eyeglass frame and the optical lens becomes more firmly and stably by the fastener.

7 Claims, 5 Drawing Sheets

ASSEMBLY OF OPTICAL LENS AND EYEGLASS FRAME

BACKGROUND OF THE INVENTION

1. Field of the Invention

The present invention relates to an assembly of an optical lens and an eyeglass frame, especially to an assembly of an optical lens and an eyeglass frame in which the optical lens and the eyeglass frame are connected tightly, without separating from each other.

2. Description of Related Art

There are various types of optical lens in eyeglasses. Among them, there is a one piece optical lens formed integrally.

Refer to Taiwanese Pat. No. M371893, an eyeglass frame is disclosed. An optical lens frame includes a narrow loading part projecting from an upper part thereof while an eyeglass frame is disposed with a concave receiving area corresponding to and having a matching width and depth of the loading part. Thus the loading part of the optical lens is locked into the receiving area. By the narrower loading part on the upper part and a wider frame edge on the lower part of the optical lens frame being locked with the corresponding receiving area and edges of two outer sides of the eyeglass frame, the optical lens frame and the eyeglass frame are assembled and positioned.

Refer to Taiwanese Pat. No. M287946, a pair of eyeglasses is disclosed. A stopping piece is formed on each of two sides of a one-piece optical lens and a projecting button is arranged at a middle part of the optical lens. A mounting slot is disposed on each of two sides of a clamping slot of an eyeglass frame and is used to receive the stopping piece on each of two sides of the optical lens. A locking part with a fixing hole is disposed on a middle part of the eyeglass frame. Thus the projecting button of the optical lens is mounted into the fixing hole so as to join the optical lens and the eyeglass frame.

However, in use, the middle part of the optical lens is easy to separate from the eyeglass frame and is falling off while being applied with a little force or a light impact because there is not stable positioning and holding structure between the middle part of the optical lens and the eyeglass frame.

Thus there is a need to provide a novel design of the assembly of an optical lens and an eyeglass frame.

SUMMARY OF THE INVENTION

Therefore it is a primary object of the present invention to provide an eyeglass assembly with better connectivity and higher stability.

In order to achieve the above object, the eyeglass assembly of the present invention includes a fastener locked and fixed between the eyeglass frame and the optical lens, and a stopping plate mounted in the eyeglass frame and corresponding to the fastener. Then the optical lens and the eyeglass frame are affixed with each other by the fastener while the fastener is further fixed on the eyeglass frame by the stopping plate. Due to the stopping plate, the fastener is not easily separated from the eyeglass frame. Thus the connection between the optical lens and the eyeglass frame become more stably and firmly.

The eyeglass frame consists of an inner frame, an outer frame, and a mounting slot defined by the inner frame and the outer frame and used for fixing and mounting the optical lens.

The fastener is inserted through and fastened with middle parts of the eyeglass frame and of the optical lens.

An insertion hole and a concave hole are respectively formed on the inner frame and the outer frame of the eyeglass frame and corresponding to each other. The optical lens includes a through hole corresponding to the insertion hole and the concave hole of the eyeglass frame. The fastener includes a plurality of claws. The claws are inserted into the insertion hole of the eyeglass frame, and through the through hole of the optical lens to be locked with the concave hole of the eyeglass frame. The stopping plate includes a plurality of mounting parts projecting toward one side thereof. After the stopping plate being mounted into the eyeglass frame and assembled with the fastener, the two adjacent mounting parts clamp two sides of the claws of the fastener so that the fastener will not separate from the eyeglass frame.

A locking slot whose opening is facing downward is disposed on the inner frame of the eyeglass frame and is corresponding to the insertion hole. The stopping plate is mounted into the locking slot to lock and fix the fastener.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
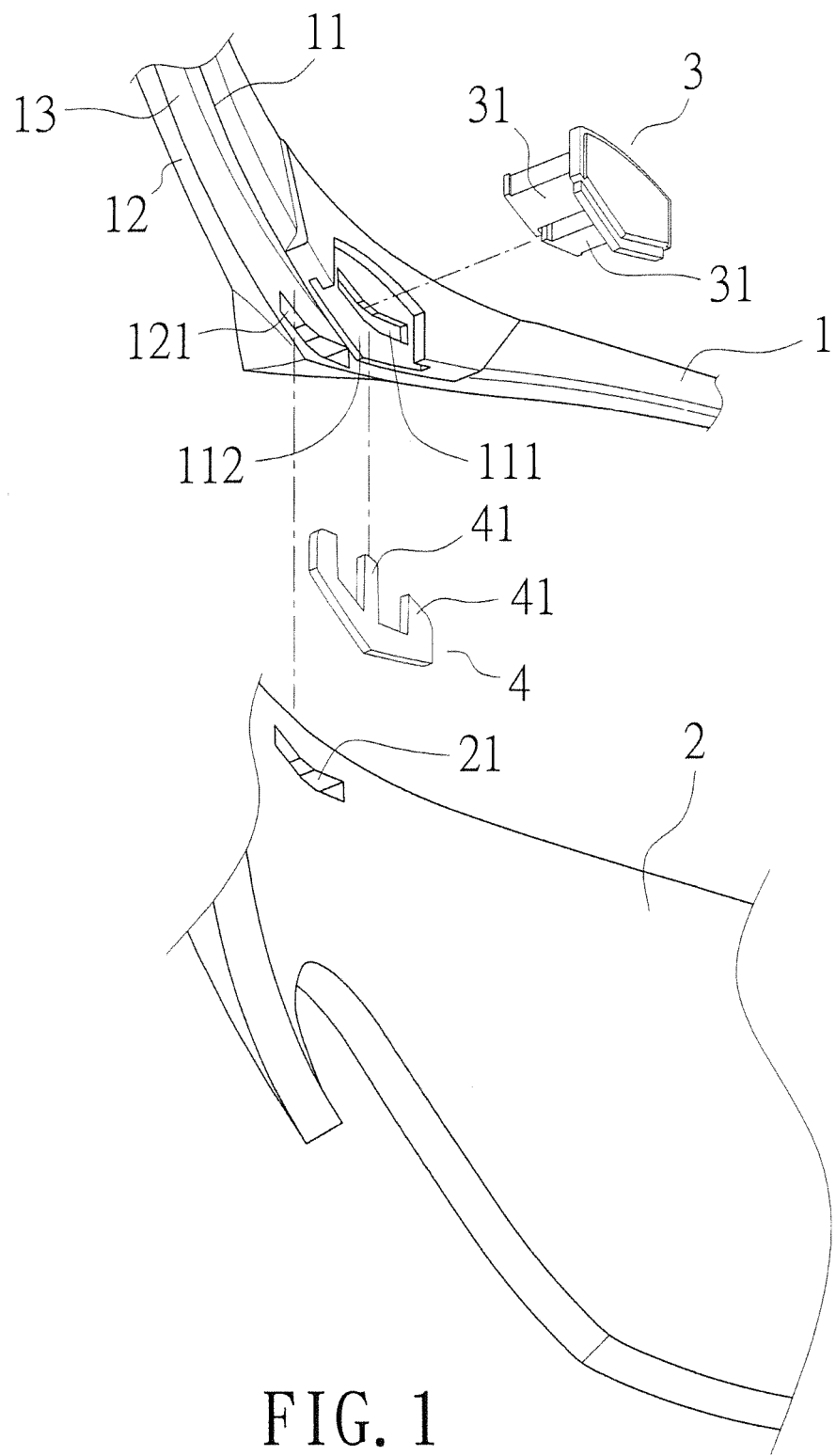
FIG. 1 is an explosive view of an embodiment according to the present invention.

Refer to FIG. 1, an assembly of an optical lens and an eyeglass frame of the present invention mainly includes a fastener 3 passed through an eyeglass frame 1 and an optical lens 2 to affix them together. The fastener 3 is locked by a stopping plate 4 mounted in the eyeglass frame 1. The eyeglass frame 1 consists of an inner frame 11, an outer frame 12, and a mounting slot 13 defined by the inner frame 11 and the outer frame 12 and used for receiving an upper edge of the optical lens 2. The two ends of the optical lens 2 are connected to and locked with the two ends of the mounting slot 13 of the eyeglass frame 1 (not shown in figure). Thereby the optical lens 2 whose two ends are connected to the eyeglass frame 1 is inserted and passed through by the fastener 3. Thus the eyeglass frame 1 and the optical lens 2 are further fastened and joined with each other more stably. Moreover, the fastener 3 is mounted with and locked by the stopping plate 4 so that the fastener 3 will not fall off or separate from the assembly of the eyeglass frame 1 and the optical lens 2.

Figure 2:
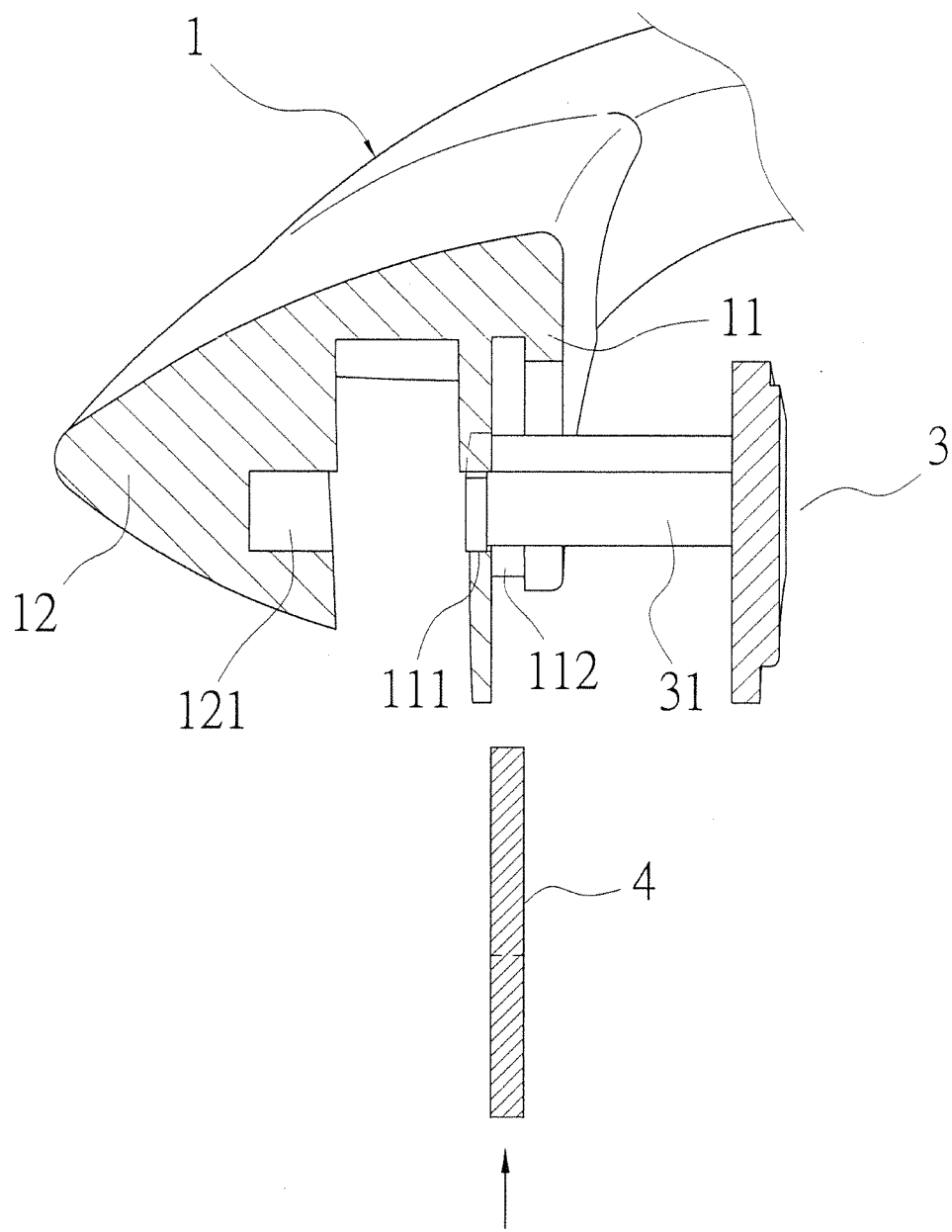
FIG. 2 is a cross sectional view of an embodiment without a fastener according to the present invention.
Figure 3:
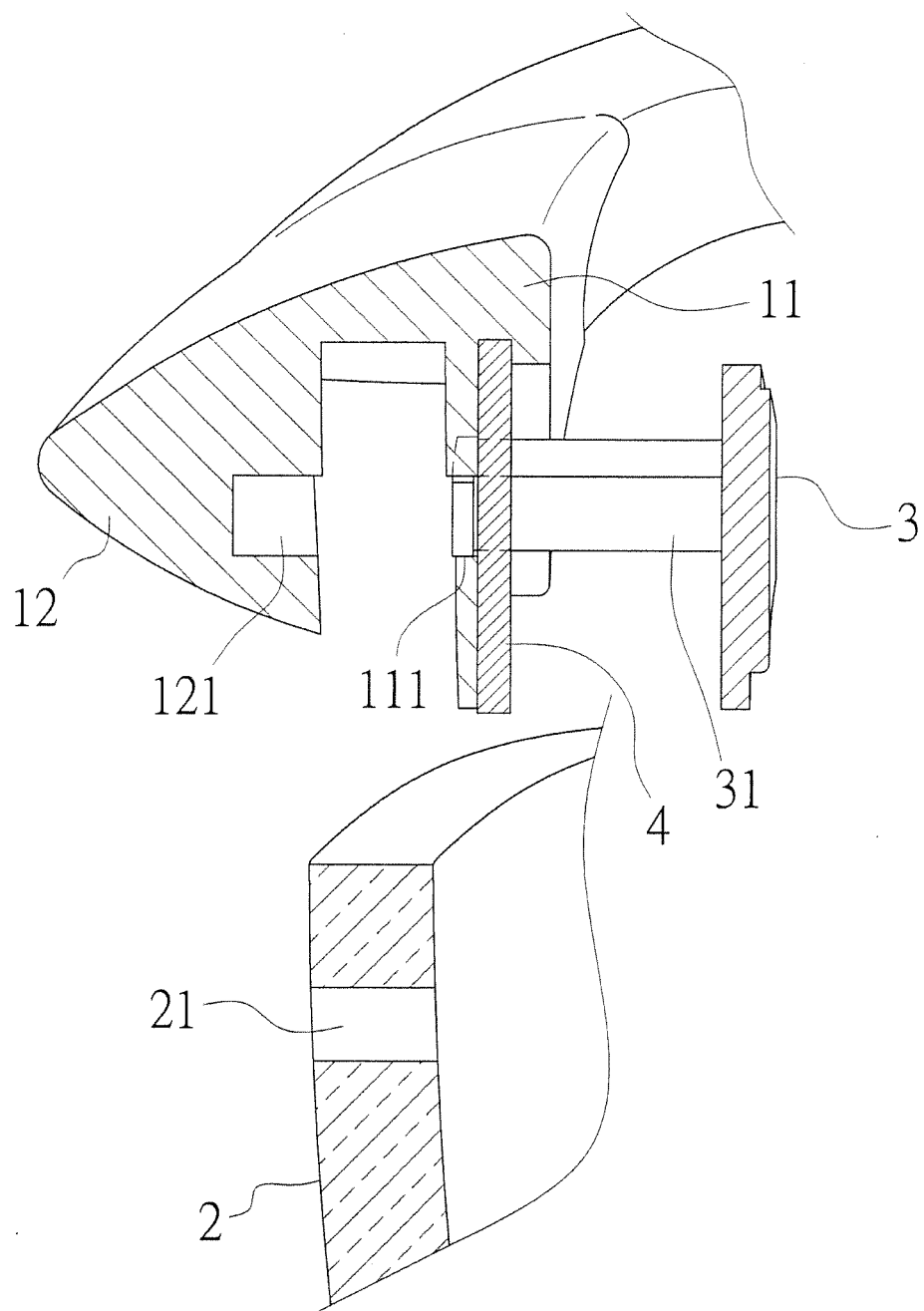
FIG. 3 is another cross sectional view of an embodiment without a fastener according to the present invention.
Figure 4:
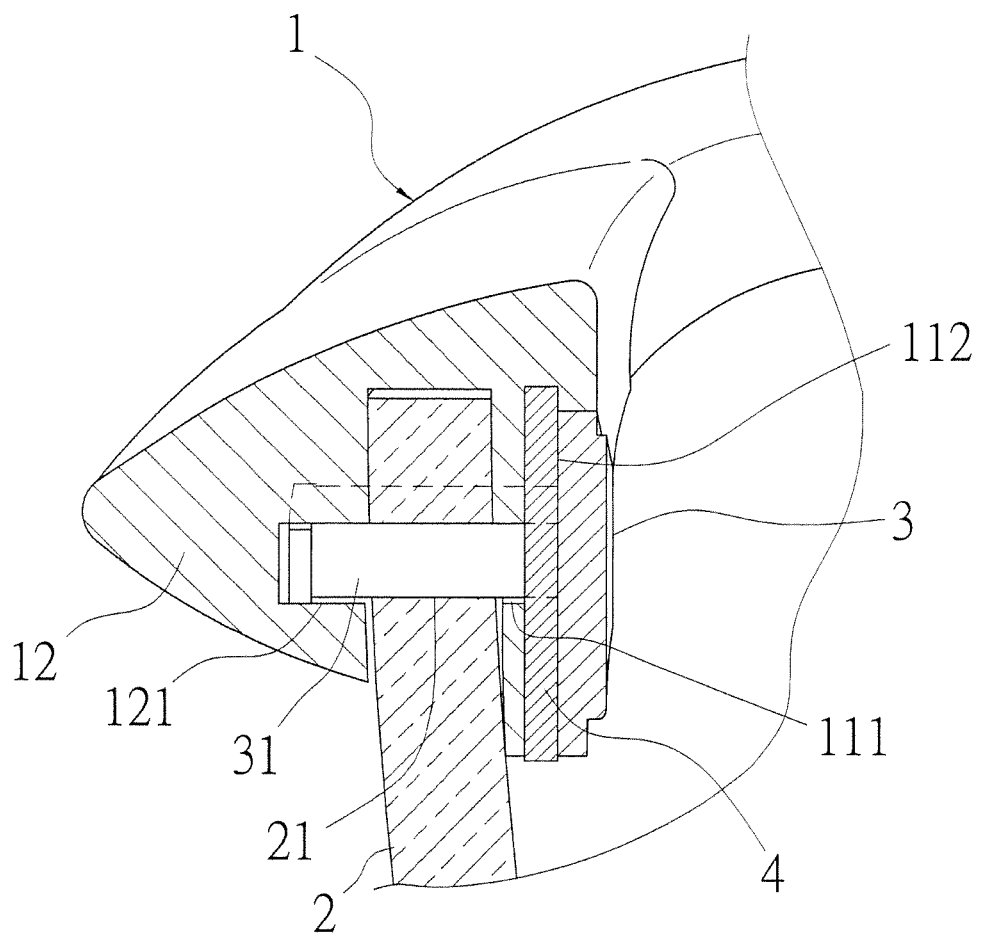
FIG. 4 is a cross sectional view of an embodiment assembled with a fastener according to the present invention.
Figure 5:
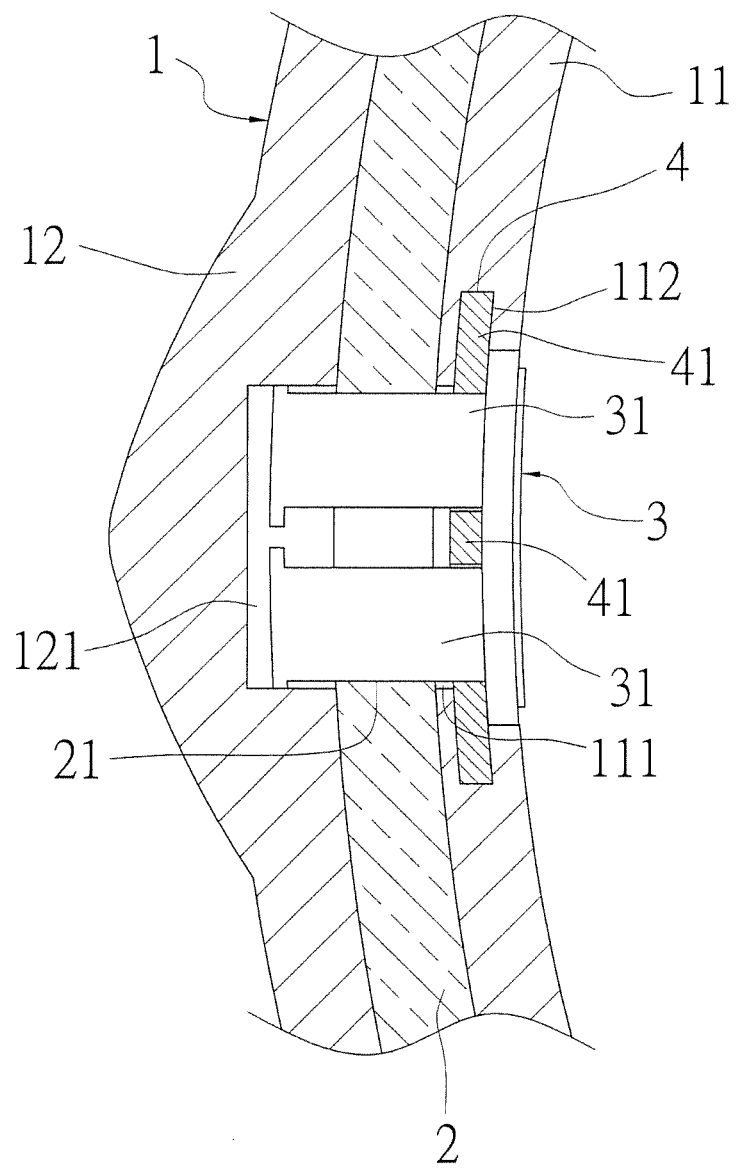
FIG. 5 is another cross sectional view of an embodiment assembled with a fastener according to the present invention.

Refer to FIG. 1 and FIG. 2, in this embodiment, the fastener 3 is passed through and fastened with a middle part of the eyeglass frame 1. Refer from FIG. 2 to FIG. 5, the inner frame 11 and the outer frame 12 on the middle part of the eyeglass frame 1 respectively include an insertion hole 111 and a concave hole 121 corresponding to each other. A through hole 21 is disposed on the optical lens 2 and is corresponding to both the insertion hole 111 and the concave hole 121. The fastener 3 includes claws 31. The claws 31 are inserted into the insertion hole 111 of the eyeglass frame 1, and through the through hole 21 of the optical lens 2 to be locked with the concave hole 121 of the eyeglass frame 1. Moreover, a locking slot 112 whose opening is facing downward is disposed on the inner frame 11 of the eyeglass frame 1 and is corresponding to the insertion hole 111. After the claws 31 being inserted into the insertion hole 111 and through the through hole 21 to be locked with the concave hole 121, the stopping plate 4 is mounted and fixed in the locking slot 112. The stopping plate 4 includes a plurality of mounting parts 41 projecting toward one side thereof. The two adjacent mounting parts 41 clamp the two sides of the claws 31 of the fastener 3 to prevent the fastener 3 from falling out of the eyeglass frame 1. Furthermore, the middle parts of the optical lens 2 and the eyeglass frame 1 are joined with each other. Thus the optical lens 2 and the eyeglass frame 1 are connected more stably and tightly.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An assembly of an optical lens and an eyeglass frame comprising a fastener having at least two fastener lugs extending from a head end of said fastener through an insertion hole formed through said eyeglass frame and a corresponding through hole formed through said optical lens and a corresponding stopping plate having at least three lugs for cooperative mounting between said fastener lugs;

wherein the fastener is inserted through the eyeglass frame and the optical lens, for fastening and fixing the optical lens to the eyeglass frame, said fastener having two ends which are connected to and locked with the eyeglass frame; the stopping plate is mounted into the eyeglass frame within a locking slot formed in the eyeglass frame, whereby the stopping plate is mounted and locked to the fastener for preventing the fastener from separating from the eyeglass frame.

2. The assembly as claimed in claim 1, wherein the eyeglass frame includes an inner frame, an outer frame and a mounting slot defined by the inner frame and the outer frame and used for mounting and fixing the optical lens.

3. The assembly as claimed in claim 2, wherein the fastener is inserted through and fastened a section of the eyeglass frame and the optical lens.

4. The assembly as claimed in claim 3, wherein the inner frame and the outer frame of the eyeglass frame are respectively provided with an insertion hole and a concave hole aligned to each other while the optical lens is disposed with said through hole aligned with the insertion hole and the concave hole of the eyeglass frame; the fastener lugs being inserted into the insertion hole of the eyeglass frame, and through the through hole of the optical lens to be locked with the concave hole of the eyeglass frame.

5. The assembly as claimed in claim 4, wherein a locking slot is formed within the inner frame of the eyeglass frame, adjacent the insertion hole for mounting with the stopping plate to the inner frame; the stopping plate includes the stopping plate lugs projecting toward one side thereof, the stopping plate being mounted into the locking slot of the eyeglass frame, a pair of stopping plate lugs clamp two sides of the fastener lugs so that the fastener is unable to be separated from the eyeglass frame.

6. The assembly as claimed in claim 2, wherein the inner frame and the outer frame of the eyeglass frame are respectively arranged with an insertion hole and a concave hole corresponding to each other while the optical lens is disposed with a through hole corresponding to the insertion hole and the concave hole of the eyeglass frame, the fastener includes at least one claw and the claw defined by at least two fastener lugs is inserted into the insertion hole of the eyeglass frame, and through the through hole of the optical lens to be locked with the concave hole of the eyeglass frame.

7. The assembly as claimed in claim 6, wherein a locking slot with an opening facing downward is disposed on the inner frame of the eyeglass frame, corresponding to the insertion hole for mounting with the stopping plate, the stopping plate includes a plurality of mounting parts defined by said stopping plate lugs and projecting toward one side thereof, the stopping plate being mounted into the locking slot of the eyeglass frame, adjacent ones of the mounting parts clamp two sides of the claw of the fastener so that the fastener is unable to be separated from the eyeglass frame.

* * * * *